(12) United States Patent
Lung

(10) Patent No.: US 11,422,524 B2
(45) Date of Patent: Aug. 23, 2022

(54) SYSTEM AND METHOD FOR AUTOMATED PLANT MAINTENANCE AND COMMUNICATION ALERTS

(71) Applicant: Katerina Lung, Lexington, MA (US)

(72) Inventor: Katerina Lung, Lexington, MA (US)

( * ) Notice: Subject to any disclaimer, the term of this patent is extended or adjusted under 35 U.S.C. 154(b) by 0 days.

(21) Appl. No.: 16/707,658

(22) Filed: Dec. 9, 2019

(65) Prior Publication Data

US 2021/0173369 A1 Jun. 10, 2021

(51) Int. Cl.
*G05B 19/042* (2006.01)
*A01G 25/16* (2006.01)
*A01B 79/00* (2006.01)
*A01G 27/00* (2006.01)
*G06V 20/10* (2022.01)

(52) U.S. Cl.
CPC ........ *G05B 19/0425* (2013.01); *A01B 79/005* (2013.01); *A01G 25/16* (2013.01); *A01G 27/006* (2013.01); *A01G 27/008* (2013.01); *G06V 20/188* (2022.01); *G05B 2219/2625* (2013.01)

(58) Field of Classification Search
CPC ........ G05B 19/0425; G05B 2219/2625; A01B 79/005; A01G 25/16; A01G 27/006; A01G 27/008; G06K 9/00657
See application file for complete search history.

(56) References Cited

U.S. PATENT DOCUMENTS 5,956,897 A 9/1999 Takashima
6,947,810 B2 9/2005 Skinner
(Continued)

FOREIGN PATENT DOCUMENTS

CN 203523472 U 4/2014
CN 104731135 A * 6/2015
(Continued)

OTHER PUBLICATIONS

Amazon, "Jushachengta 8 Pack Automatic Plant Waterers, Plant Watering Devices, Automatic Slow Release Vacation Plant Waterer Slow Release for Outdoor & Indoor Use", https://www.amazon.com/JUSHACHENGTA-Automatic-Waterering-Vacation/dp/B074NYPSMX, accessed Dec. 2, 2020 (10 pages).
(Continued)

*Primary Examiner* — Chad G Erdman
(74) *Attorney, Agent, or Firm* — Wilmer Cutler Pickering Hale and Dorr LLP

(57) ABSTRACT

A system for automated plant condition notification, detection, and watering to improve plant growth and maintenance including a computing unit, an optical sensor, a soil moisture sensor, a water tank level sensor, a pump, and a computing unit. The computing unit includes a memory and a processor that receives a first input indicative of a user identifier and a communication type, a second input indicative of a plant type, a soil moisture input, a water level input, and an optical sensor input. The processor also determines a water pump initiation threshold and a water pump completion threshold based on one or more of the plant type, the optical sensor input, or the soil moisture input and determines a plant maturity optical value based on the plant type. Additionally, the processor transmits a water pump initiation, a water pump completion signal, and a notification via a selected communication method.

19 Claims, 3 Drawing Sheets

(56) References Cited

U.S. PATENT DOCUMENTS

| | | |
|---|---|---|
| 8,584,397 B1 | 11/2013 | Marsh |
| 8,620,480 B2 | 12/2013 | Alexanian |
| 9,076,105 B2 | 7/2015 | Anderson |
| 2010/0064581 A1 | 3/2010 | Johnson |
| 2015/0100168 A1 | 4/2015 | Oliver et al. |
| 2016/0183483 A1* | 6/2016 | Motohari Sharif .. A01G 25/165 700/284 |
| 2016/0192602 A9 | 7/2016 | Alexanian |
| 2019/0159411 A1* | 5/2019 | Gungl ................... A01G 25/167 |
| 2019/0259108 A1* | 8/2019 | Bongartz ............... A01G 7/045 |

FOREIGN PATENT DOCUMENTS

| | | | |
|---|---|---|---|
| JP | 2008029307 A | * | 2/2008 |
| WO | WO-2001056367 A1 | | 8/2001 |

OTHER PUBLICATIONS

Bisen, N.T., "Automatic Plant Watering System Using Arduino Uno—Arduino Project Hub", https://create.arduino.cc/projecthub/neetithakur/automatic-plant-watering-system-using-arduino-uno-8764ba, posted Jun. 8, 2018 (34 pages).

Jadhav, "Smart Plant Monitoring wiht SMS Alert: Keep Plants Hydrated", https://create.arduino.cc/projecthub/uchihamadara301198/smart-plant-monitoring-with-sms-alert-keep-plants-hydrated-13cf92, posted Feb. 26, 2019 (26 pages).

Video: "Arduino plant watering system (simple)", https://www.youtube.com/watch?v=Y73twlAdcLs, posted Nov. 10, 2017 (1 page).

Video: "Automatic Watering System for Plants using Arduino", https://www.youtube.com/watch?v=nUHizmtyt74, posted Jul. 10, 2017 (1 page).

* cited by examiner

SYSTEM AND METHOD FOR AUTOMATED PLANT MAINTENANCE AND COMMUNICATION ALERTS

TECHNICAL FIELD

The present disclosure relates to automated plant maintenance, and in particular, computerized systems and methods for watering plants and notifying users about the condition of plants.

BACKGROUND

Traditionally, fruit and vegetation are manually watered and can become unhealthy or die when not properly cared for. For example, a user's delivery of too much water, too little water, or inconsistent delivery of water can affect the health of a plant. Additionally, fruit and vegetation are also manually monitored to determine ripeness or maturity. Fruit and vegetation that are not picked at the proper ripeness can spoil and become unusable for consumption.

SUMMARY OF THE INVENTION

Embodiments of the present disclosure include a system for automated plant condition notification, detection, and watering to improve plant growth and maintenance, that includes a computing unit, an optical sensor communicably connected to the computing unit, a soil moisture sensor communicably connected to the computing unit, a water tank level sensor communicably connected to the computing unit, a pump communicably connected to the computing unit. In some embodiments, the computing unit includes a processor and a memory, the processor capable of executing instructions stored on the memory and configured to receive a first input indicative of a user identifier and a communication type; receive a second input indicative of a plant type; receive a soil moisture input from the soil moisture sensor indicative of a soil moisture level; receive a water level input indicative of a water level reading from the water tank level sensor; and receive an optical sensor input from the optical sensor. In other embodiments, the processor may also determine a water pump initiation threshold and a water pump completion threshold based on one or more of the plant type, the optical sensor input, or the soil moisture input; determine a plant maturity optical value based on the plant type; transmit a water pump initiation signal to initiate a watering event based on the water pump initiation threshold; and transmit a water pump completion signal to stop the watering event based on the water pump completion threshold. In yet another embodiment, the processor may transmit a notification to the user identifier, via the communication type, the notification including one or more of a plant maturity message when the optical sensor input is within a range of the plant maturity optical value, a water level message when the water level input is less than the water level threshold, and a soil moisture level message.

In some embodiments, the processor is further configured to receive a third input indicative of a communication interval time. In other embodiments the notification is sent at the communication time interval time and includes one or more of the soil moisture input, the water pump completion signal, and the optical sensor input. In yet other embodiments, the first input is one of a phone number, an email address, an instant message username, or a social media profile identifier and the water pump initial signal is transmitted in response to the soil moisture input falling below a lower threshold value. In other embodiments, the water pump completion signal is in response to the soil moisture input reaching an upper threshold value and the soil moisture threshold value is based on the plant type. In yet other embodiments, the notification includes at least one of a phone call, a text message, an email, or a social media post.

In other embodiments of the present disclosure, a system is discloses for automated plant condition notification, detection, and watering to improve plant growth and maintenance including a computing unit, an optical sensor communicably connected to the computing unit, a soil moisture sensor communicably connected to the computing unit, a water tank level sensor communicably connected to the computing unit, and a pump communicably connected to the computing unit. In some embodiments, the computing unit may include a processor and a memory, the processor capable of executing instructions stored on the memory, and the processor configured to receive a first input indicative of a user identifier and a communication type; a second input indicative of a plant type; a third input indicative of a communication interval time; a soil moisture input from the soil moisture sensor indicative of a soil moisture level; a water level input indicative of a water level reading from the water tank level sensor; and an optical sensor input from the optical sensor. In other embodiments, the processor may also determine a water pump initiation threshold and a water pump completion threshold based on one or more of the plant type, the optical sensor input, or the soil moisture input; a plant maturity optical value based on the plant type; and a water level threshold based on one or more of the plant type and a water tank type. In yet other embodiments, the process may be further configured to transmit a water pump initiation signal to initiate a watering event based on the water pump initiation threshold; a water pump completion signal to stop a watering event based on the water pump completion threshold; and a notification to the user identifier, via the communication type. In some embodiments, the notification including one or more of: a plant maturity message when the optical sensor input is within a range of the plant maturity optical value, and a water level message when the water level input is less than the water level threshold. In some embodiments, the system may further include that at the communication interval time, the notification includes one or more of the soil moisture input, the water pump completion signal, and the optical sensor input.

In other embodiments, the present disclosure includes a method for growing plants, comprising receiving, at a computing unit, a first input indicative of a user identifier and a communication type; receiving, at the computing unit, a second input indicative of a plant type; receiving, at the computing unit, a soil moisture input from the soil moisture sensor indicative of a soil moisture level; receiving, at the computing unit, a water level input indicative of a water level reading from the water tank level sensor; and receiving, at the computing unit, an optical sensor input from the optical sensor. Some embodiments may also include determining, at a computing unit, a water pump initiation threshold and a water pump completion threshold based on one or more of the plant type, the optical sensor input, or the soil moisture input; determining, at the computing unit, a plant maturity optical value based on the plant type; transmitting, from the computing unit, a water pump initiation signal based on the water pump initiation threshold; transmitting, from the computing unit, a water pump completion signal to stop the watering event based on the water pump completion threshold; and transmitting, from the computing unit, a notification to the user identifier, via the communication type. In other embodiments, the notification including one or more of a plant maturity message when the optical sensor input is within a range of the plant maturity optical value, a water level message when the water level input is less than the water level threshold, and a soil moisture level message.

In some embodiments, the method may also include receiving a third input, at the computing unit, a third input indicative of a communication interval time. In other embodiments, transmitting a notification occurs at the communication interval time and includes one or more of the soil moisture input, the water pump completion signal, and the optical sensor input and the water pump initiation signal is in response to the water level input falling below a threshold measurement associated with the growth phase. In yet other embodiments, the first input is one of a phone number, an email address, an instant message username, or a social media profile identifier and/or the communication interval is set to correspond with the soil moisture level falling below a threshold value. In some embodiments, the water pump completion signal is in response to the soil moisture input reaching an upper threshold value or the soil moisture threshold value is based on the plant type. In other embodiments, the notification includes at least one of a phone call, a text message, an email, or a social media post.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Systems and methods are described herein for automated watering and maintenance of plants. To address some of the aforementioned plant watering and maintenance issues, in some embodiments, watering of plants is automated using a computer device to monitor a moisture sensor, optical sensor, and water level sensor. In some embodiments, when a moisture level, color level, or water level is outside of a threshold level, water is automatically applied to a plant and/or a notification is sent to a user. The user notification can include a message instructing the user to provide more water or to tend to the plant (e.g., picking fruit that has ripened, or flowers that have reached full maturity).

Figure 1:
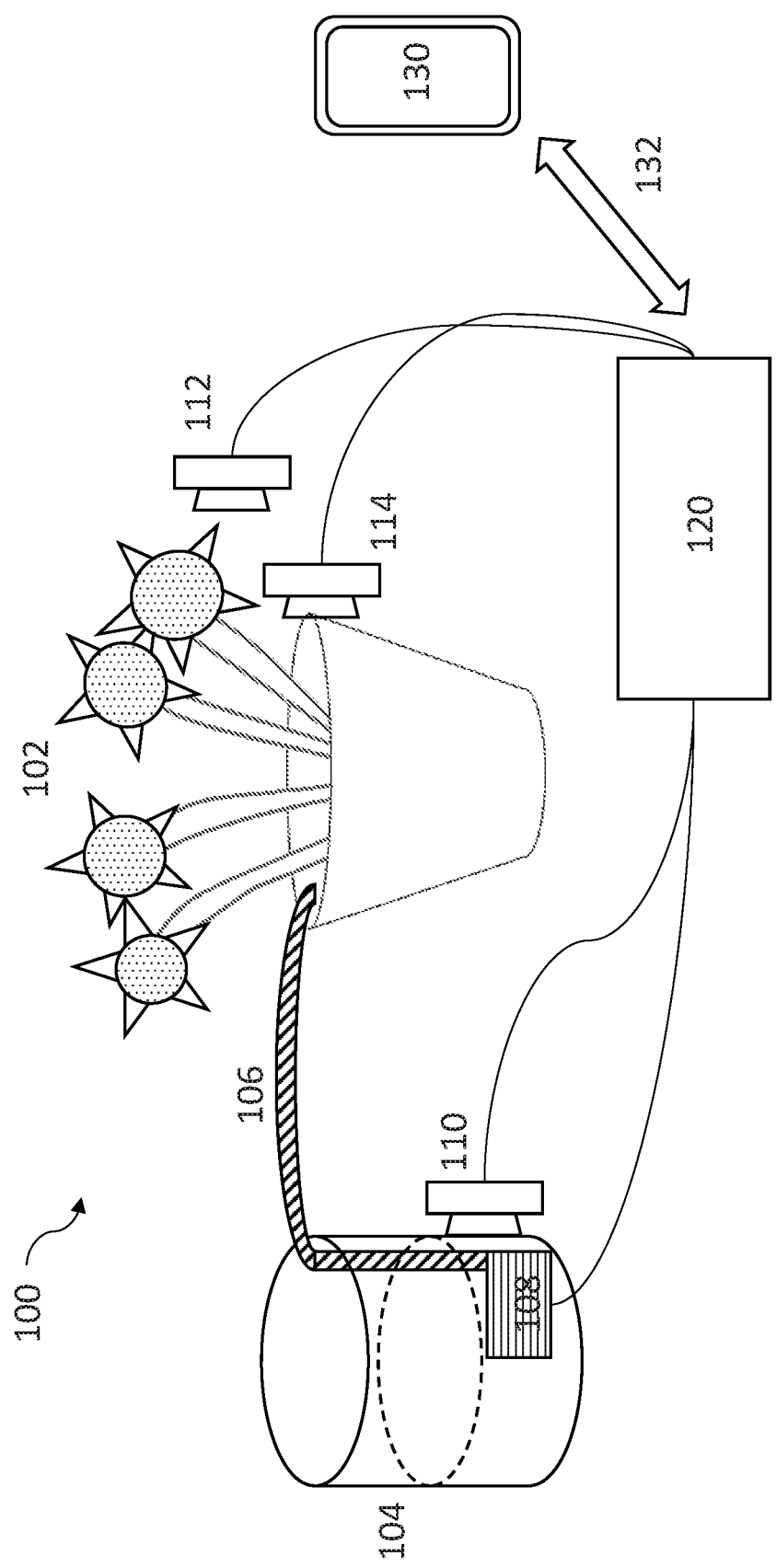
FIG. 1 is a system diagram showing an automated watering system, according to some embodiments of the present disclosure.

FIG. 1 is a system diagram showing an automated watering system, according to some embodiments of the present disclosure. FIG. 1 shows an automated plant maintenance system 100, including plant 102, water container 104, water dispenser 106, water pump 108, water sensor 110, optical sensor 112, moisture sensor 114, plant condition controller 120, user device 130, connection 132. In some embodiments, the plant maintenance system 100 may further include a video camera (not shown).

Plant 102 is any type of fruit, vegetable, or other vegetation. In some embodiments, plant 102 requires at least water to survive and can reach optimal growth points. For example, an optimal growth point for a plant can include producing fruit of a particular ripeness or flowers at a specified phase of maturity. As explained in more detail below, the ripeness of fruit or the maturity of vegetation can be determined based on a color of the fruit or vegetation or some other visual characteristic of the fruit or vegetation.

The amount of water needed by plant 102 depends on the type of plant, a growth phase of the plant, and the environmental conditions surrounding the plant. As described in more detail below, the amount of water needed by plant 102 can be determined by measuring the soil moisture around the plant.

Water container 104 is a receptacle for holding water for the plant. Water container 104 can also hold other fluids for delivery to the plant, e.g., fertilizer, insecticide. Water from water container 104 can be provided to plant 102 via water dispenser 106. Water dispenser 106 can be positioned to deliver water to the plant from any position that results in water being provided to one or more portions of the plant (e.g., from the top wetting leaves, flowers, and/or fruit first; from the top wetting the top of the soil first; from the bottom wetting roots of the plant first). The position of water dispenser 106 can depend on a type of plant 102. Water dispenser 106 can include one or more outlets for dispensing water.

Water pump 108 provides water from water container 104 to water dispenser 106. Water pump 108 can be a motorized device that pulls or otherwise transports water from water container 104 and forces water through water dispenser 106. Water pump 108 can be controlled, as described in more detail below, to turn on and off and to provide varying amounts of water to plant 102. Water pump 108 can include an individual or multiple mechanisms by which differing amounts of water may be dispensed to different portions of plant 102. Similarly, water dispenser 106 may comprise more than one water dispenser avenues by which water may be dispensed by water pump 108 to plant 102.

Water sensor 110 senses an amount of water remaining in water container 104. In some embodiments, water sensor 110 determines a water level in water container 104. Water sensor 110 can be positioned within water container 104 or external to water container 104. Water sensor 110 can measure a water level from within the container, for example, based on an amount of water sensor submerged in water. Water sensor 110 can also measure a water level outside of the container, for example, by a distance of the water level from either the top or bottom of the container 104. Water sensor 110 is operably coupled to plant condition controller 120 using either a wired or wireless connection. Water sensor 110 communicates information related to the water level within water container 104 to plant condition controller 120.

Optical sensor 112 measures a color of plant 102. The color of a surface of the plant can be detected, for example, by shining light on plant 102 and measuring the light reflected off plant 102. Optical sensor 112 is operably coupled to plant condition controller 120 using either a wired or wireless connection. Optical sensor 112 communicates color information of the plant 102 to plant condition controller 120. As described in more detail below, plant condition controller 120 can use the color information to adjust an amount of water provided to plant 102 or to send a message relating to the condition of plant 102. For example, plant condition controller 120 can use the color information to determine that a flower or fruit of plant 102 is mature or ripe and send a message to a user notifying the user that the flower or fruit can be harvested.

In some embodiments, plant 102 is placed in soil or some other medium in which to grow plant 102. The soil can be one or more of sand, silt, clay, or any other organic material, such as bark or sawdust. Moisture sensor 114 measures a moisture level of the soil surrounding plant 102. In some embodiments, moisture sensor 114 measures the moisture level of the soil surrounding the plant 102 within a range of values. Moisture sensor 114 is operably coupled to plant condition controller 120 using either a wired or wireless connection. Moisture sensor 114 communicates moisture information of the soil surrounding plant 102 to plant condition controller 120. As described in more detail below, plant condition controller 120 can use the moisture information to adjust an amount of water provided to plant 102 or to send a message relating to the condition of plant 102.

Plant condition controller 120 receives information from water sensor 110, optical sensor 112, and moisture sensor 114 and processes the received information to control water pump 108 and/or to send messages to a user device 130. As described in more detail below, plant condition controller 120 can also receive inputs from user device 130 or from any other input device connected to plant condition controller 120. Through user device 130 or another input source, plant condition controller 120 can receive plant-specific information (e.g., a type of plant, plant maturity, plant health) and be programmed to process received moisture and color information differently based on the plant-specific information. Plant condition controller 120 may also determine plant-specific information based on received inputs. For example, plant condition controller 120 may be able to determine plant maturity based on the received plant growth color from optical sensor 112. User device 130 communicates with plant condition controller via a connection 132, which can be a wired or wireless connection. In some embodiments, connection 132 is a wireless connection that supports text messages and email communications.

Figure 2:
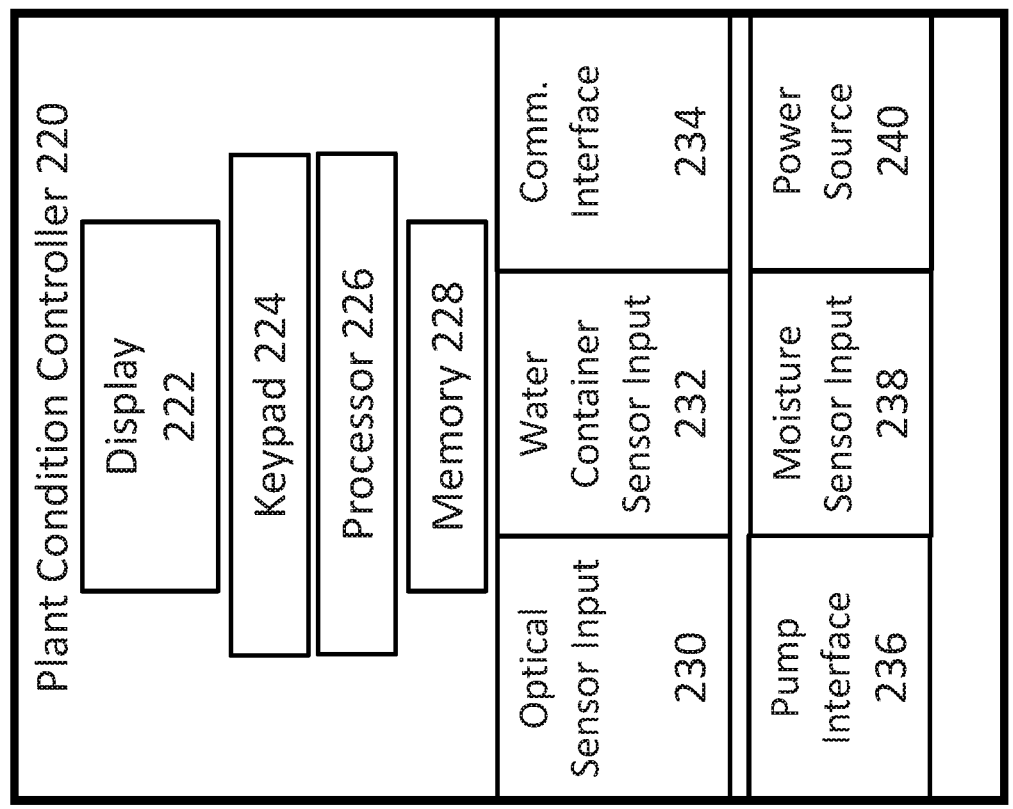
FIG. 2 is a system diagram showing a plant condition processing module, according to some embodiments of the present disclosure.

FIG. 2 is a system diagram showing the components within plant condition controller 220, according to one embodiment of the present disclosure. Plant condition controller 220 corresponds with plant condition controller 120 shown in FIG. 1 and includes a display 222, a keypad 224, a processor 226, a memory 228, an optical sensor input 230, a tank sensor input 232, a communications interface 234, a pump interface 236, a moisture sensor input 238, and a power source 240. In some embodiments, plant condition controller 220 may comprise a pre-assembled computing unit such as an Arduino computing system or Rasberry Pi. Power source 240 may be a self-contained power source, such as a battery or power bank, or an external power source, such as a wall plug or external battery. In some embodiments, plant condition controller 220 may also include a camera input (not shown) capable of receiving video feed of plant 102.

Display 222 may be configured to display inputs indirectly received from a user via keypad 224. Display 222 may also be configured to receive inputs directly by way of a touch-pad or other touch functionality. In some embodiments, display 222 may be configured to display messages in response to inputs received via at least one of optical sensor input 230, tank sensor input 232, communication interface 234, pump interface 236, and moisture sensor 238.

Processor 226 may execute commands received from memory 228, as triggered by inputs received via optical sensor input 230, tank sensor input 232, communication interface 234, pump interface 236, and moisture sensor 238. Memory 228 may include executable commands programmed by a user using keypad 224. In some embodiments, memory 228 may receive executable commands from a user via wired or wireless programming inputs from a separate computing device (not shown). Memory 228 may store information regarding plant 102 such as plant type, plant growth phase metrics (e.g., size, shape, color), threshold moisture values, watering schedule time entries, user identifiers (e.g., phone number, email address, social media accounts), and soil composition or type, among others. In some embodiments, memory 228 may store data in a relational format such that the information regarding plant 102 is associated. For example, memory 228 may associate a specific plant type with a related growth phase matrix or water sequence schedule. Memory 228 may also store commands and alert strings intended for a user via user device 130.

Optical sensor input 230 receives inputs regarding the visual characteristics of plant 102 from optical sensor 112 (shown in FIG. 1). Tank sensor input 232 receives inputs regarding the level of the fluid in water container 104 from sensor 110 (shown in FIG. 1). Moisture sensor input 238 receives input regarding the moisture level of the soil in plant 102 from moisture sensor 114 (shown in FIG. 1). Pump interface 236 provides commands, from processor 226 and memory 228, to water pump 108 (shown in FIG. 1) which, when executed, cause water pump 108 to dispense water from water container 104.

Communications interface 234 sends communications to user device 130 (shown in FIG. 1) over connection 132. Communications sent via communications interface 234 may include alerts such as messages alerting a user that the plant soil has a low moisture level, as read by moisture sensor 114, a low water level in water container 104 as received by tank sensor input 232, or a plant color that is abnormal as received via optical sensor input 230 from optical sensor 112. Communications interface 234 can be programmed to only send alerts at discrete time intervals as set by a user during monitoring operation. Communications interface 234 can also send video feed still images or video feed live images received from a video camera via the camera input (not shown). In some cases, the video feed still images or video feed live images may be sent as part of the message (e.g., text message or email) sent to the user device 130. In some embodiments, communications interface 234 may enable bi-directional communication between plant condition controller 220 and a user. In such embodiments, communications interface 234 may receive commands executed by a user via user device 130 and execute or respond to the received command.

Memory 228 and processor 226 may communicably coupled to each of keypad 224, optical sensor 230, tank sensor input 232, communication interface 234, pump interface 236, and moisture sensor 238 such that inputs received from those inputs and interfaces may be stored in memory 228 or executed upon by process 226. In some embodiments, a user may use keypad 224 to enter a user phone number to be stored in memory 228. Additionally, a user may enter a number corresponding to a plant type stored in a table within memory 228, wherein the plant type includes associated watering intervals, color profiles, and growth pattern for the plant type. In yet another embodiment, the user may enter via keypad 224 a numeric time interval for when processor 226 should send a text message to a user via communication interface 234.

For example, memory 228 may be programmed by a user to include instructions to water a plant, such as plant 102 in FIG. 1, when an input received via moisture sensor input 238 falls below a threshold value set by a user. In such a case, processor 226 may receive instruction from memory 228, based upon the input received from moisture sensor input 238, to send instructions via pump interface 236 to water pump 108, shown in FIG. 1, to operate until moisture sensor 238 indicates that the soil of plant 102 has a moisture value above the threshold value set by the user. In another embodiment, processor 226 may receive inputs via both optical sensor input 230 and moisture sensor input 238 indicating that plant 102.

Figure 3:
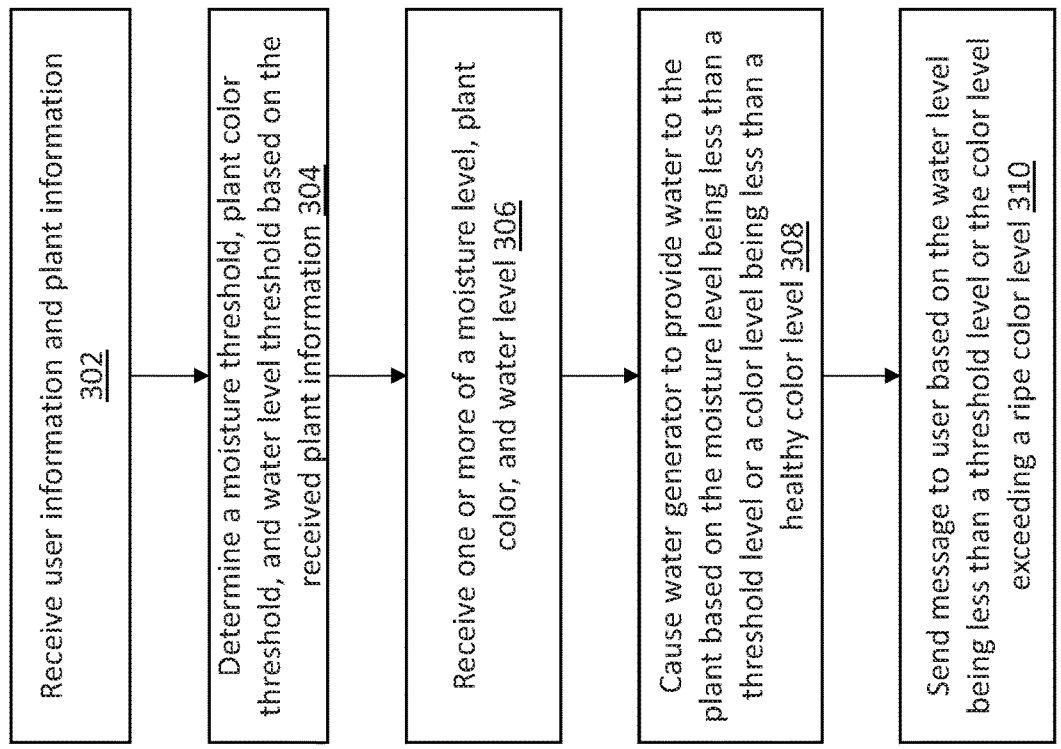
FIG. 3 is a flow chart showing a process for automated watering of plants, according to some embodiments of the present disclosure.

FIG. 3 is a flow chart showing a process for automated watering of plants, according to some embodiments of the present disclosure.

Referring to step 302, plant condition controller 120 receives user information and plant information. User information can include a phone number, email address, or other username or device identifier. User information can be used by plant condition controller 120 to send messages to a user device 130 associated with the user information. For example, user information can include information for user "Jane Doe," such as a phone number (e.g., (123) 456-7890)), an email address (e.g., jane.doe@iloveplants.com), or other user identifier (e.g., Jane Doe's social media user name). Plant condition controller 120 sends Jane Doe messages by texting Jane Doe at her phone number, sending an email to Jane Doe's email address, or by posting a message on Jane Doe's social media account.

Plant information can include a plant type or plant condition. As described in more detail below, plant information can be used to set different thresholds (e.g., minimum water level, minimum amount of soil moisture, colors associated with ripeness or maturity) that are further used to determine the timing and amount of water to provide to plant 102 or the timing, content, and/or frequency of messages sent to user device 130. Plant information can be received by plant condition controller 120 from user device or from a separate input device connected to plant condition controller 120. For example, user Jane Doe, using a user interface on device 132 can input a plant type (e.g., rose, tomato, strawberry) and other plant information such as a color (e.g., "orange" rose, "yellow" tomato).

For example, in step 302, a user may, first, use a keypad or touch-enabled display to type in his or her phone number into the plant condition controller to be stored within the memory. Second, a user may indicate the plant type by typing a number corresponding to a specific plant type programmed in the memory of the plant condition controller. Third, a user can indicate the time interval by which they want to receive periodic updates about the status of the plant. In some cases, a user may want to receive updates about the soil moisture level and optical sensor reading every day or once a week. In some embodiments, the time interval may be set as a function of the plant type identified by the user.

Referring to step 304, plant condition controller 120 determines a moisture threshold, plant color threshold, and water level threshold based on the received plant information. For example, plant condition controller 120 sets the moisture threshold to a higher value for a plant that requires a relatively high amount of water during a watering cycle and sets the moisture threshold to a lower level for a plant that requires a relatively small amount of water during a watering cycle. To set the appropriate moisture threshold, plant condition controller 120 can correlate the received plant information with plant information stored in memory 228. Plant information in memory 228 can be stored in a relational format that associates plant type and plant condition with different moisture, plant color, and water level thresholds. Moisture threshold can also be directly input by a user as a parameter in the received plant information. Plant condition controller 120 similarly sets moisture threshold and plant color threshold values based on received plant information.

In some embodiments, plant condition controller 120 can set multiple threshold levels for each of a moisture threshold, plant color threshold, and water level threshold based on the received plant information. For example, plant color threshold can include a healthy color threshold level (e.g., green leaves turning yellow indicate that more water is needed) and/or a ripeness threshold level (e.g., tomatoes turning a certain shade and uniformity of red are ready for harvest). In other embodiments, plant color threshold may determine the growth of weeds around plant 102, for example by detecting a spike in the color green or other visual indicators of undesired growth.

Referring to step 306, plant condition controller 120 receives a water level, plant color, and moisture level from water sensor 110, optical sensor 112, and moisture sensor 114, respectively. Water level can include information indicative of an amount of water measured from the bottom of container 104 to the surface of the water (e.g., "1 inch") or relative water level (e.g., higher or lower than a threshold). Plant color can include information indicative of an absolute plant color (e.g., red, orange, yellow, purple) or an RGB (red-green blue) or XYZ color value. Moisture level can include information indicative of an amount of water in the soil (e.g., a percentage of water in the soil).

Referring to step 308, plant condition controller 120 causes water pump 108 to dispense water from water tank 104 to plant 102 based on the moisture level being less than a threshold level or a color level being less than a specified color level. Plant condition controller 120 may execute a water initiation command the trigger water pump 108. The operation of water pump 108 can be executed in response to a triggering event. In some embodiments, the triggering event may be the moisture level of the soil surrounding plant 102 falling below a threshold value set by the user. The triggering event may also be the color of plant 102 falling outside the bounds of a color profile as set by a user.

In other embodiments, the triggering event may be based on the combined measurements received at plant condition controller 120 from both optical sensor 112 and moisture sensor 114. For example, a user may program the memory of plant condition controller 120 to recognize, based on a selected plant type as explained above, the growth phase of plant 102 based on the input received via optical sensor 112. After determining the growth phase of plant 102, plant condition controller 120 may identify an associated optimum moisture level for that determined growth phase. Plant condition controller 120 may then execute operation of water pump 108 if the moisture level determined from moisture sensor 114 is below the optimum moisture level associated with the determined growth phase of plant 102.

Referring to step 310, plant condition controller 120 sends a message to user based on the beginning or ending of a triggering event, as described above in conjunction with step 308. For example, plant condition controller 120 may send a message to a user based on the water level in water tank 104 being less than a threshold level or the color level exceeding a ripeness or maturity color level. Similarly, plant condition controller 120 may send a message to a user based on the moisture level in plant 102 reaching the desired moisture content level and indicating that a successful watering operation has concluded. In other embodiments, the user may receive a message from plant condition controller 120 based on the set message interval as described above, regardless of the measured values from optical sensor 112 and moisture sensor 114. For example, the message sent by plant condition controller 120 may include "Your plant is ripe," "Water Tank Empty," "New growth detected," "Your plant is properly watered," "Weed detected," "Your plant is healthy" or other messages relevant to the nurtured growth of plant 102. Following the receipt of the message at step 310, a user can then decide how to proceed with the best course of action to nurture the growth of plant 102.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A system for automated plant condition notification, detection, and watering to improve plant growth and maintenance, the system comprising:
   a computing unit,
   an optical sensor communicably connected to the computing unit, a soil moisture sensor communicably connected to the computing unit, a water tank level sensor communicably connected to the computing unit, the water tank level sensor is configured to sense a water level reading of a water tank, a pump communicably connected to the computing unit, the pump being configured to pump water from the water tank to a plant, the computing unit including a processor and a memory, the processor capable of executing instructions stored on the memory, the processor configured to:

receive a first input indicative of a user identifier, the first input being sent via a communication type;

receive a second input indicative of a plant type;

receive a soil moisture input from the soil moisture sensor indicative of a soil moisture level;

receive a water level input indicative of the water level reading of the water tank from the water tank level sensor;

receive an optical sensor input from the optical sensor, determine a water pump initiation threshold and a water pump completion threshold based on one or more of the plant type, the optical sensor input, or the soil moisture input;

determine a plant maturity optical value based on the plant type;

determine a water level threshold based on one or more of the plant type, the optical sensor input, and a water tank type;

transmit a water pump initiation signal to turn on the pump based on the water pump initiation threshold;

transmit a water pump completion signal to turn off the pump based on the water pump completion threshold; and transmit a notification to the user identifier, via the communication type, the notification including one or more of:

a plant maturity message when the optical sensor input is within a range of the plant maturity optical value, a water level message when the water level input is less than the water level threshold, and a soil moisture level message.

2. The system of claim 1, wherein the processor is further configured to receive a third input indicative of a communication interval time.

3. The system of claim 2, wherein the notification is sent at the communication time interval time and includes one or more of the soil moisture input, the water pump completion signal, and the optical sensor input.

4. The system of claim 1, wherein the first input is one of a phone number, an email address, an instant message username, or a social media profile identifier.

5. The system of claim 1, wherein the water pump initiation signal is transmitted in response to the soil moisture input falling below a lower threshold value.

6. The system of claim 1, wherein the water pump completion signal is in response to the soil moisture input reaching an upper threshold value.

7. The system of claim 1, wherein the soil moisture threshold value is based on the plant type.

8. The system of claim 1, wherein the notification includes at least one of a phone call, a text message, an email, or a social media post.

9. A system for automated plant condition notification, detection, and watering to improve plant growth and maintenance, the system comprising:

a computing unit, an optical sensor communicably connected to the computing unit, a soil moisture sensor communicably connected to the computing unit, a water tank level sensor communicably connected to the computing unit, the water tank level sensor is configured to sense a water level reading of a water tank, a pump communicably connected to the computing unit, the pump being configured to pump water from the water tank to a plant, the computing unit including a processor and a memory, the processor capable of executing instructions stored on the memory, the processor configured to:

receive a first input indicative of a user identifier, the first input being sent via a communication type;

receive a second input indicative of a plant type;

receive a third input indicative of a communication interval time;

receive a soil moisture input from the soil moisture sensor indicative of a soil moisture level;

receive a water level input indicative of the water level reading of the water tank from the water tank level sensor;

receive an optical sensor input from the optical sensor, determine a water pump initiation threshold and a water pump completion threshold based on one or more of the plant type, the optical sensor input, or the soil moisture input;

determine a plant maturity optical value based on the plant type;

determine a water level threshold based on one or more of the plant type, the optical sensor input, and a water tank type;

transmit a water pump initiation signal to turn on the pump based on the water pump initiation threshold;

transmit a water pump completion signal to turn off the pump based on the water pump completion threshold; and transmit a notification to the user identifier, via the communication type, the notification including one or more of:

a plant maturity message when the optical sensor input is within a range of the plant maturity optical value, and a water level message when the water level input is less than the water level threshold.

10. The system of claim 9, wherein, at the communication interval time, the notification includes one or more of the soil moisture input, the water pump completion signal, and the optical sensor input.

11. A method for growing plants, comprising:

receiving, at a computing unit, a first input indicative of a user identifier, the first input being sent via a communication type;

receiving, at the computing unit, a second input indicative of a plant type;

receiving, at the computing unit, a soil moisture input from a soil moisture sensor indicative of a soil moisture level;

receiving, at the computing unit, a water level input indicative of a water level reading of a water tank from a water tank level sensor;

receiving, at the computing unit, an optical sensor input from an optical sensor, determining, at a computing unit, a water pump initiation threshold and a water pump completion threshold based on one or more of the plant type, the optical sensor input, or the soil moisture input;

determining, at the computing unit, a plant maturity optical value based on the plant type;

determining, at the computing unit, a water level threshold based on one or more of the plant type, the optical sensor input, and a water tank type;

transmitting, from the computing unit, a water pump initiation signal to turn on a water pump based on the water pump initiation threshold;

transmitting, from the computing unit, a water pump completion signal to turn off the water pump based on the water pump completion threshold; and transmitting, from the computing unit, a notification to the user identifier, via the communication type, the notification including one or more of:
- a plant maturity message when the optical sensor input is within a range of the plant maturity optical value,
- a water level message when the water level input is less than the water level threshold, and
- a soil moisture level message.

12. The method of claim 11 further comprising receiving a third input, at the computing unit, a third input indicative of a communication interval time.

13. The method of claim 12, wherein, transmitting a notification occurs at the communication interval time and includes one or more of the soil moisture input, the water pump completion signal, and the optical sensor input.

14. The method of claim 11, wherein the water pump initiation signal is in response to the water level input falling below a threshold measurement associated with the growth phase.

15. The method of claim 11, wherein the first input is one of a phone number, an email address, an instant message username, or a social media profile identifier.

16. The method of claim 11, wherein the communication interval is set to correspond with the soil moisture level falling below a threshold value.

17. The method of claim 11, wherein the water pump completion signal is in response to the soil moisture input reaching an upper threshold value.

18. The method of claim 11, wherein the soil moisture threshold value is based on the plant type.

19. The method of claim 13, wherein the notification includes at least one of a phone call, a text message, an email, or a social media post.

* * * * *